(12) United States Patent
Moutray et al.

(10) Patent No.: US 10,760,741 B2
(45) Date of Patent: Sep. 1, 2020

(54) BOSS WITH INTERNAL BEARING

(71) Applicant: Hexagon Technology AS, Alesund (NO)

(72) Inventors: Brad James Moutray, Sioux Falls, SD (US); John Allen Eihusen, Lincoln, NE (US); Brian Christopher Yeggy, Lincoln, NE (US)

(73) Assignee: Hexagon Technology AS, Alesund (NO)

(*) Notice: Subject to any disclaimer, the term of this patent is extended or adjusted under 35 U.S.C. 154(b) by 192 days.

(21) Appl. No.: 15/616,050

(22) Filed: Jun. 7, 2017

(65) Prior Publication Data

US 2017/0370527 A1 Dec. 28, 2017

Related U.S. Application Data

(60) Provisional application No. 62/353,725, filed on Jun. 23, 2016.

(51) Int. Cl.
*F17C 13/08* (2006.01)
*F16C 23/04* (2006.01)
(Continued)

(52) U.S. Cl.
CPC .......... *F17C 13/08* (2013.01); *F16C 11/0695* (2013.01); *F16C 23/043* (2013.01);
(Continued)

(58) Field of Classification Search
CPC . F16C 11/0685; F16C 11/069; F16C 11/0695; F16C 11/106; F16C 23/043;
(Continued)

(56) References Cited

U.S. PATENT DOCUMENTS 2,380,562 A   7/1945   Watson
3,343,832 A   9/1967   Gustafsson
(Continued)

FOREIGN PATENT DOCUMENTS

DE            2851011 A1    6/1979
DE      102012112806 A1    6/2014
(Continued)

OTHER PUBLICATIONS

International Search Report and Written Opinion dated Sep. 28, 2017 for International Application No. PCT/US2017/036358.
(Continued)

*Primary Examiner* — Josh Skroupa
(74) *Attorney, Agent, or Firm* — Mai-Tram D. Lauer; Westman, Champlin & Koehler, P.A.

(57) ABSTRACT

A boss configured for attachment to a pressure vessel includes a first bore therein and a bearing disposed at least partially within the first bore. A system for supporting a pressure vessel on a vessel mount includes a boss, a bearing, and an attachment element. The boss is attached to the pressure vessel and has a first bore therein. The bearing is disposed at least partially within the first bore and has a second bore therethrough. The attachment element is configured to be affixed to the vessel mount, wherein a portion of the attachment element extends through the second bore and is slidable within the first and second bores substantially along a longitudinal axis of the pressure vessel. A method is described for supporting a pressure vessel on a vessel mount.

13 Claims, 7 Drawing Sheets

(51) Int. Cl.
*F16C 35/02* (2006.01)
*F16C 11/06* (2006.01)

(52) U.S. Cl.
CPC ...... *F16C 35/02* (2013.01); *F17C 2205/0305* (2013.01); *F17C 2209/22* (2013.01); *Y10T 403/32196* (2015.01); *Y10T 403/32704* (2015.01)

(58) Field of Classification Search
CPC .. F16C 35/02; F16C 11/0609; F16C 11/0619; F16C 11/0623; F16M 11/14; F16M 11/2075; F16M 13/02; F16M 13/022; F17C 13/08; F17C 2205/0305; F17C 2209/22; Y10T 403/32196; Y10T 403/32204; Y10T 403/32311; Y10T 403/32631; Y10T 403/32639; Y10T 403/32704; Y10T 403/32737
USPC .............. 403/76, 77, 90, 122, 123, 131, 135
See application file for complete search history.

(56) References Cited

U.S. PATENT DOCUMENTS

| | | | |
|---|---|---|---|
| 3,653,624 A | 4/1972 | Abel | |
| 3,698,251 A * | 10/1972 | Silvia | F16C 11/0619 74/5 R |
| 3,700,200 A | 10/1972 | Batchelor | |
| 4,235,267 A | 11/1980 | Brake | |
| 4,526,015 A | 7/1985 | Laskaris | |
| 4,555,083 A | 11/1985 | Carter | |
| 4,588,171 A | 5/1986 | Stephens | |
| 5,035,084 A | 7/1991 | Towns | |
| 5,230,580 A | 7/1993 | Henkel | |
| 5,499,570 A | 3/1996 | Bergelin et al. | |
| 5,515,997 A | 5/1996 | Kirk | |
| 5,720,411 A | 2/1998 | Darby | |
| 5,996,980 A | 12/1999 | Frey et al. | |
| 6,536,722 B2 | 3/2003 | Sadowski | |
| 6,880,341 B2 | 4/2005 | Parkman | |
| 6,986,490 B2 | 1/2006 | Eihusen | |
| 7,137,474 B2 | 11/2006 | Yokote | |
| 7,731,051 B2 | 6/2010 | Rohwer | |
| 7,837,054 B2 | 11/2010 | Van Oyen | |
| 8,087,626 B1 * | 1/2012 | Weeden | F16M 11/14 248/218.4 |
| 8,356,786 B2 | 1/2013 | Guckes | |
| 8,408,600 B2 | 4/2013 | Kondo | |
| 8,550,442 B2 * | 10/2013 | Philippe | F16M 11/14 269/271 |
| 8,967,209 B2 | 3/2015 | Ho | |
| 9,291,195 B1 * | 3/2016 | Parker | F16C 11/069 |
| 9,416,518 B2 * | 8/2016 | Ditzler | F16C 11/069 |
| 9,587,670 B2 * | 3/2017 | Matignon | F16C 11/06 |
| 9,683,698 B2 * | 6/2017 | Uchida | F17C 1/16 |
| 9,995,360 B2 * | 6/2018 | Khan | F16M 11/14 |
| 2003/0006349 A1 | 1/2003 | Sadowski | |
| 2004/0056164 A1 | 3/2004 | Eihusen | |
| 2004/0075034 A1 | 4/2004 | Yokote | |
| 2008/0136072 A1 | 6/2008 | Kolb et al. | |
| 2015/0176674 A1 * | 6/2015 | Khan | F16C 23/043 403/120 |
| 2018/0320734 A1 * | 11/2018 | Rousseau | F16C 11/083 |

FOREIGN PATENT DOCUMENTS

| | | |
|---|---|---|
| EP | 2034199 A1 | 3/2009 |
| GB | 2008863 A | 6/1979 |
| JP | S6020744 A | 2/1985 |
| RU | 2602014 C2 | 11/2016 |

OTHER PUBLICATIONS

Chinese Office Action for corresponding Chinese Patent Application No. 201780038068.0, dated Nov. 4, 2019.
Chinese Search Report for corresponding Chinese Patent Application No. 201780038068.0, dated Oct. 25, 2019.
Russian Office Action for corresponding Russian Patent Application No. 2019101043, dated Apr. 13, 2020.

* cited by examiner

BOSS WITH INTERNAL BEARING

CROSS REFERENCE TO RELATED APPLICATION

This application claims the benefit of priority from U.S. Provisional Patent Application No. 62/353,725, filed Jun. 23, 2016, which is hereby fully incorporated by reference.

BACKGROUND

The present disclosure relates generally to fluid storage, and specifically to boss for a fluid containment container and a method for mounting the fluid containment container using the boss. A particularly suitable fluid containment container is a pressure vessel. A typical pressure vessel includes a load bearing outer shell and a fluid impermeable inner liner.

Suitable pressure vessel shell materials include metals, such as steel; or composites, which may include laminated layers of wound fiberglass filaments or other synthetic filaments bonded together by a thermal-setting or thermoplastic resin. The fiber may be fiberglass, aramid, carbon, graphite, or any other generally known fibrous reinforcing material. The resin material used may be epoxy, polyester, vinyl ester, thermoplastic, or any other suitable resinous material capable of providing fiber-to-fiber bonding, fiber layer-to-layer bonding, and the fragmentation resistance required for the particular application in which the vessel is to be used. Details relevant to the formation of an exemplary pressure vessel are disclosed in U.S. Pat. No. 4,838,971, entitled "Filament Winding Process and Apparatus," which is incorporated herein by reference.

An elastomeric or other non-metal resilient liner or bladder often is disposed within the composite shell to seal the vessel and prevent internal fluids from contacting the composite material. The liner can be manufactured by compression molding, blow molding, injection molding, or any other generally known technique. Alternatively, the liner can be made of other materials, including steel, aluminum, nickel, titanium, platinum, gold, silver, stainless steel, and any alloys thereof. Such materials can be generally characterized as having a high modulus of elasticity. In one embodiment, the liner is formed of blow molded high density polyethylene (HDPE).

The composite construction of the vessels provides numerous advantages such as lightness in weight and resistance to corrosion, fatigue and catastrophic failure. These attributes are due at least in part to the high specific strengths of the reinforcing fibers or filaments. Such composite vessels are commonly used for containing a variety of fluids under pressure, such as hydrogen, oxygen, natural gas, nitrogen, methane, propane, and rocket or other fuel, for example. Generally, pressure vessels can be of any size or configuration. The vessels can be heavy or light, single-use (i.e., disposable), reusable, subjected to high pressures (greater than 50 psi, for example), low pressures (less than 50 psi, for example), or used for storing fluids at elevated or cryogenic temperatures, for example. Descriptions relevant to pressure vessels are presented in U.S. Pat. No. 5,476,189, entitled "Pressure vessel with damage mitigating system," which is hereby incorporated by reference.

Composite pressure vessels of the character described above originally were developed for aircraft and aerospace applications primarily because of the critical weight restrictions in such vehicles. As compressed natural gas (CNG) has become more widely used in ground-based vehicles such as buses and cars, however, the composite pressure vessel has become more widely used. The structural requirements of a pressure vessel are such that a generally cylindrical shape having rounded ends is a highly-desirable form factor from a standpoint of both strength and packing efficiency. However, the rounded shape can make securing such a pressure vessel to a vehicle difficult.

The neck of the compressed gas cylinder provides a structural protrusion suitable for attachment by a collar or similar device. Certain known designs make use of this feature to secure a gas cylinder. However, such designs suffer from a number of drawbacks. Some designs handle misalignment poorly and can place substantial stresses on the neck structure in the event of misalignment. Other designs inadequately secure the neck, so that there is a risk that the cylinder may detach from the mount under certain conditions. Moreover, in some cases, the cylinder can rotate about the principal axis of the cylinder, thereby placing stress on connection lines or other attached hardware.

SUMMARY

In one aspect, a boss configured for attachment to a pressure vessel includes a first bore therein and a bearing disposed at least partially within the first bore. In another aspect, a system for supporting a pressure vessel on a vessel mount includes a boss, a bearing, and an attachment element. The boss is attached to the pressure vessel and has a first bore therein. The bearing is disposed at least partially within the first bore and has a second bore therethrough. The attachment element is configured to be affixed to the vessel mount, wherein a portion of the attachment element extends through the second bore and is slidable within the first and second bores substantially along a longitudinal axis of the pressure vessel.

In yet another aspect, a method is described for supporting a pressure vessel on a vessel mount. The pressure vessel has a boss having a first bore therein and a bearing disposed at least partially within the first bore and having a second bore therethrough. The method includes inserting a first portion of an attachment element through the second bore and a portion of the first bore, and mounting a second portion of the attachment element to the vessel mount.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

U.S. Pat. No. 6,986,490 by Eihusen et al., entitled "Method and apparatus for mounting a fluid containment cylinder", which is hereby fully incorporated by reference, describes a prior art vessel securement method and apparatus that provides for securely fastening a pressure vessel against axial and rotational movement while enabling the pressure vessel mounting structures to accommodate a degree of misalignment without unduly stressing the neck of the pressure vessel.

Figure 1:
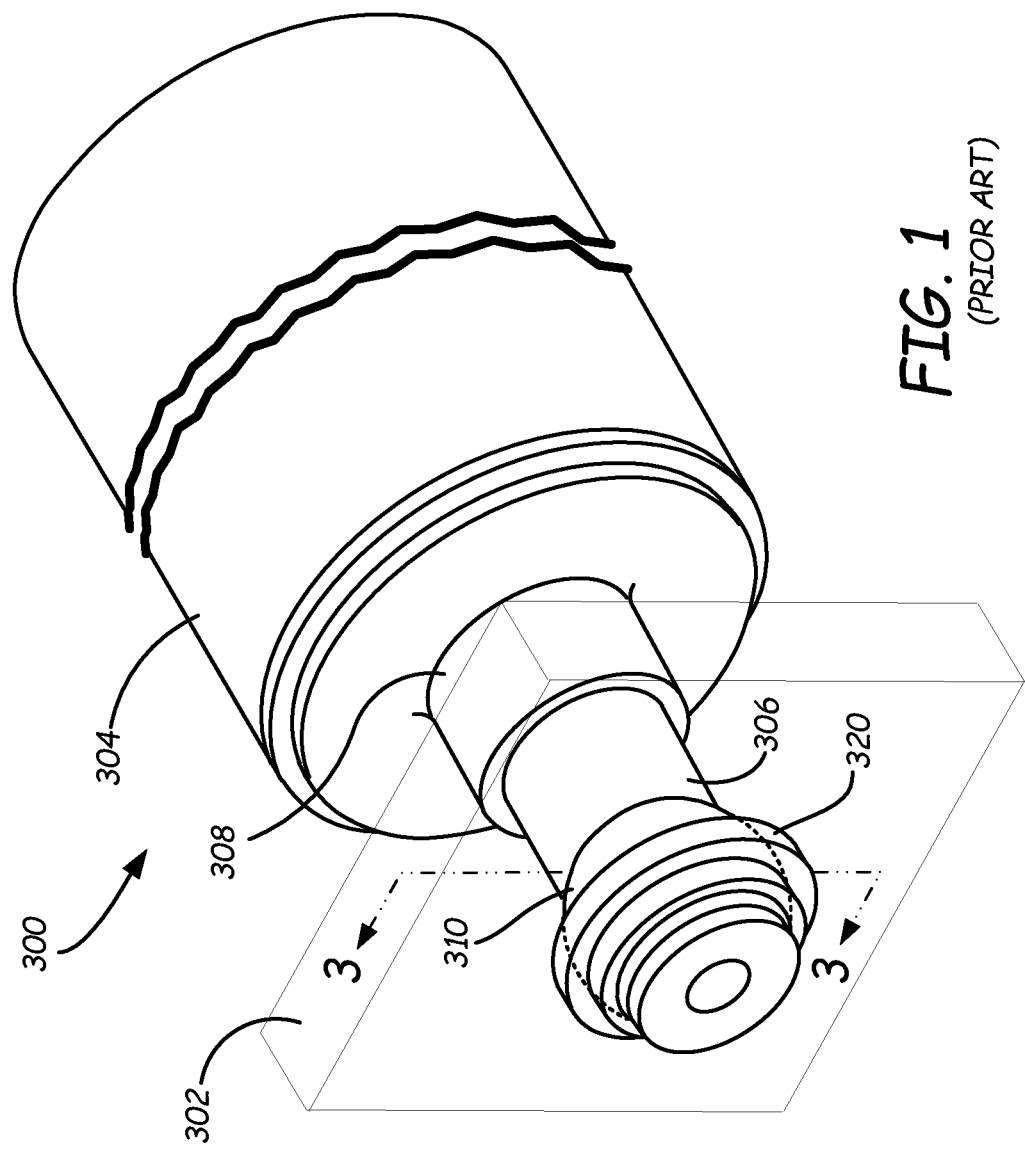
FIG. 1 is a perspective view of a prior art pressure vessel and mount assembly, with frame 302 shown as transparent for illustrative purposes.
Figure 2:
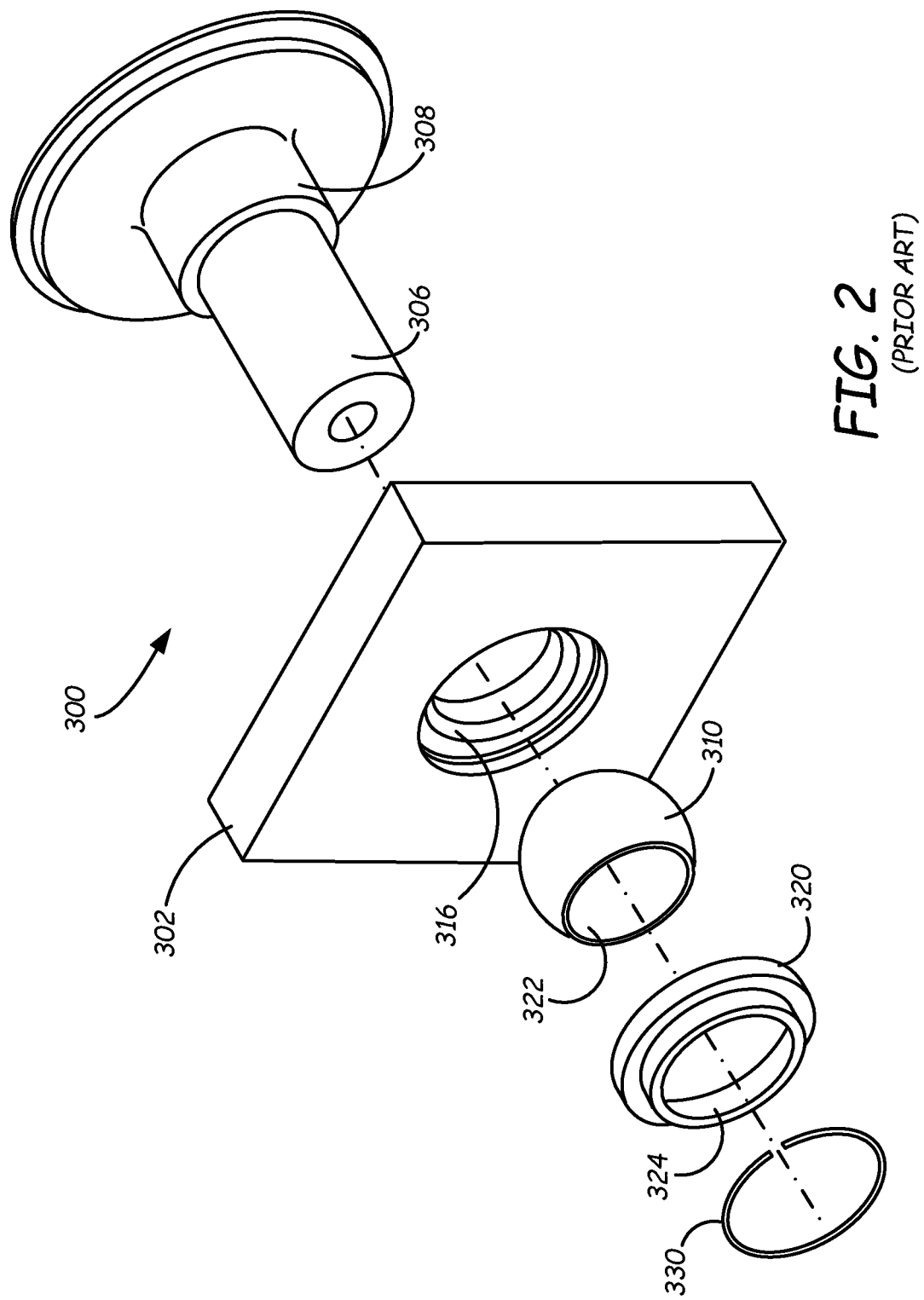
FIG. 2 is an exploded perspective view of the boss and mount assembly of FIG. 1.
Figure 3:
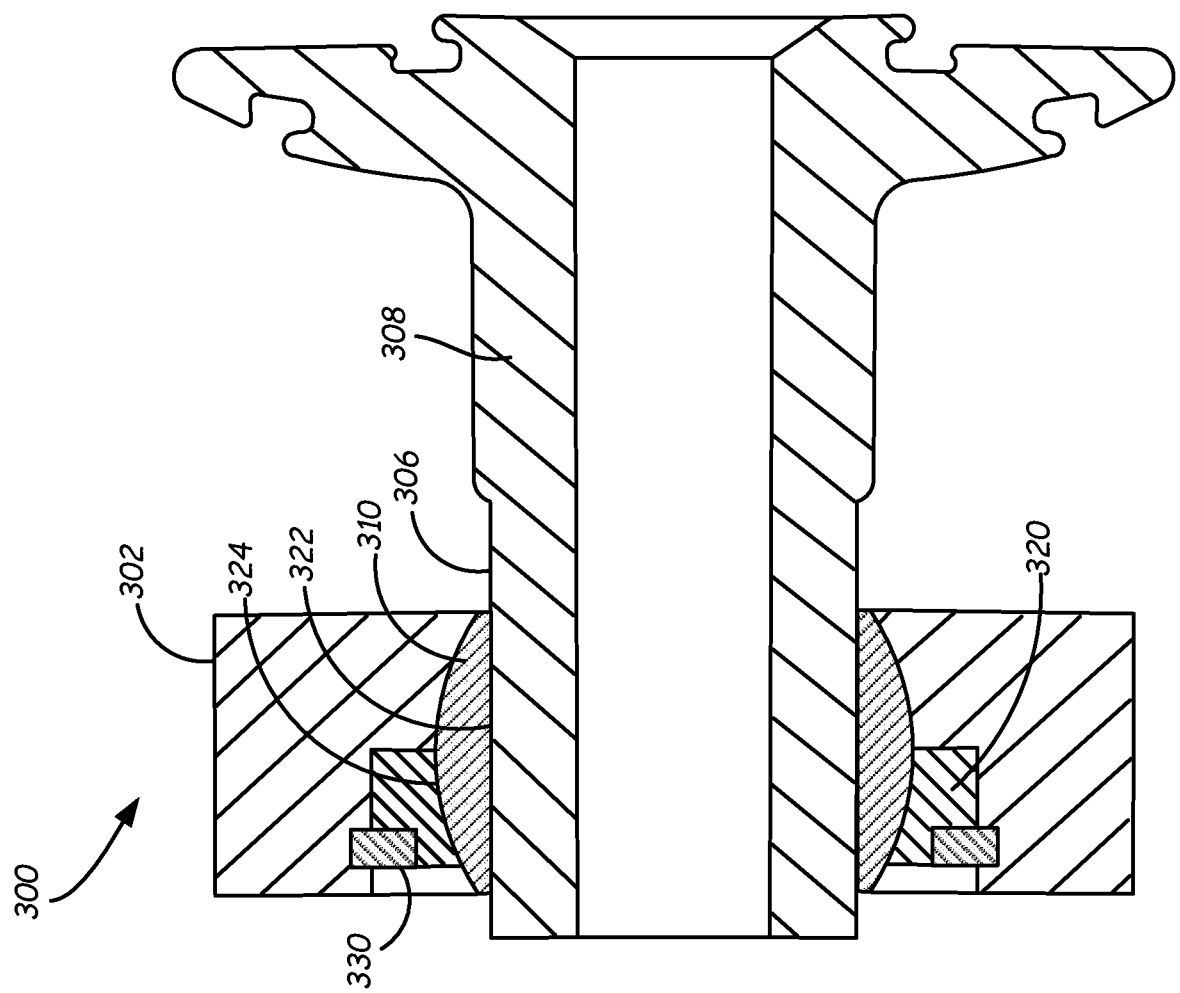
FIG. 3 is a cross-sectional view of the assembled boss and mount assembly, taken along line 3-3 of FIG. 1.

As shown in FIGS. 1-3, a prior art cylinder and frame assembly 300 includes spherical bearing 310 disposed around the outer surface of neck 306 of boss 308 of cylinder 304. Boss 308 may be a boss such as that disclosed in U.S. Pat. No. 5,429,845, entitled "Boss for a filament wound pressure vessel," which is hereby incorporated by reference. The inner surface 322 of spherical bearing 310 is shaped to mate with the outer surface of the neck 306. For example, the inner surface 322 is cylindrical, in order to conform to the cylindrical shape of the neck 306. As assembled, spherical bearing 310 seats against a spherical inner surface 316 in the frame 302. The spherical bearing 310 is captured within frame 302 by securing collar 320. Securing collar 320 may have a partially spherical inner surface 324 shaped to seat with the outer surface of spherical bearing 310. Securing collar 320 is retained in frame 302 by snap ring 330. A certain degree of axial misalignment can be tolerated by the assembly 300 without placing potentially harmful stresses on the neck 306 of boss 308 of cylinder 304. However, pressure vessels are often mounted in locations having limited space, such as in vehicles. In such locations, the extended neck 306, frame 302, bearing 310 and securing collar 320 require valuable space.

FIGS. 4-7 show an exemplary boss 12 of the present disclosure, wherein mounting structures for the boss 12 and attached pressure vessel 10 are provided within an interior bore 26 of the boss 12. Thus, for a designated space, vessel 10 can be longer than cylinder 304 (thereby providing a larger volumetric capacity) because fewer structures external to vessel 10 are required for mounting vessel 10. The disclosed boss 12 and method for mounting a composite pressure vessel 10 allow for vessel expansion without occupying valuable space.

Figure 4:
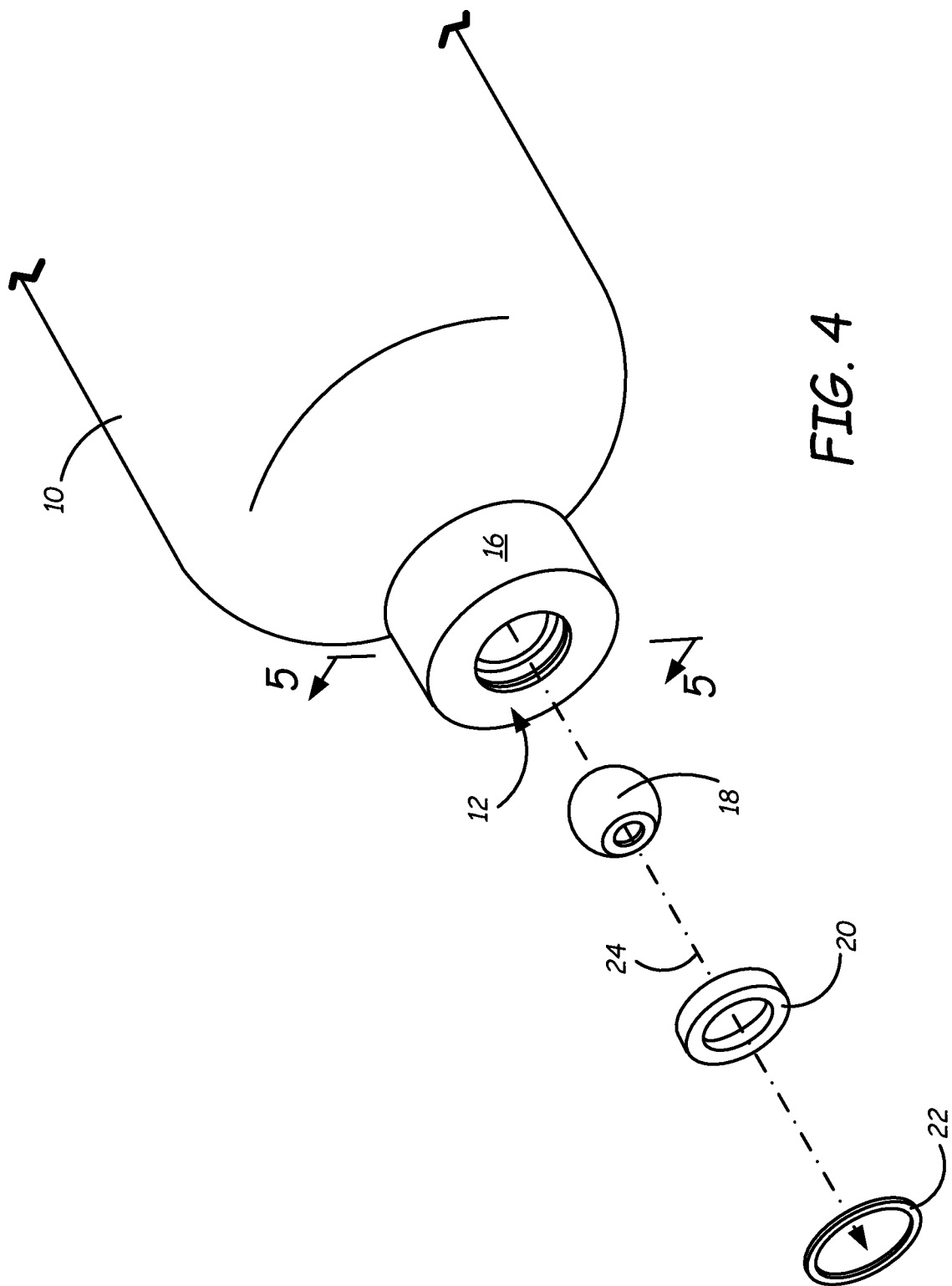
FIG. 4 is a perspective view of a pressure vessel with an exemplary embodiment of a boss of the present disclosure, wherein components of the boss are separated therefrom in an exploded view.
Figure 5:
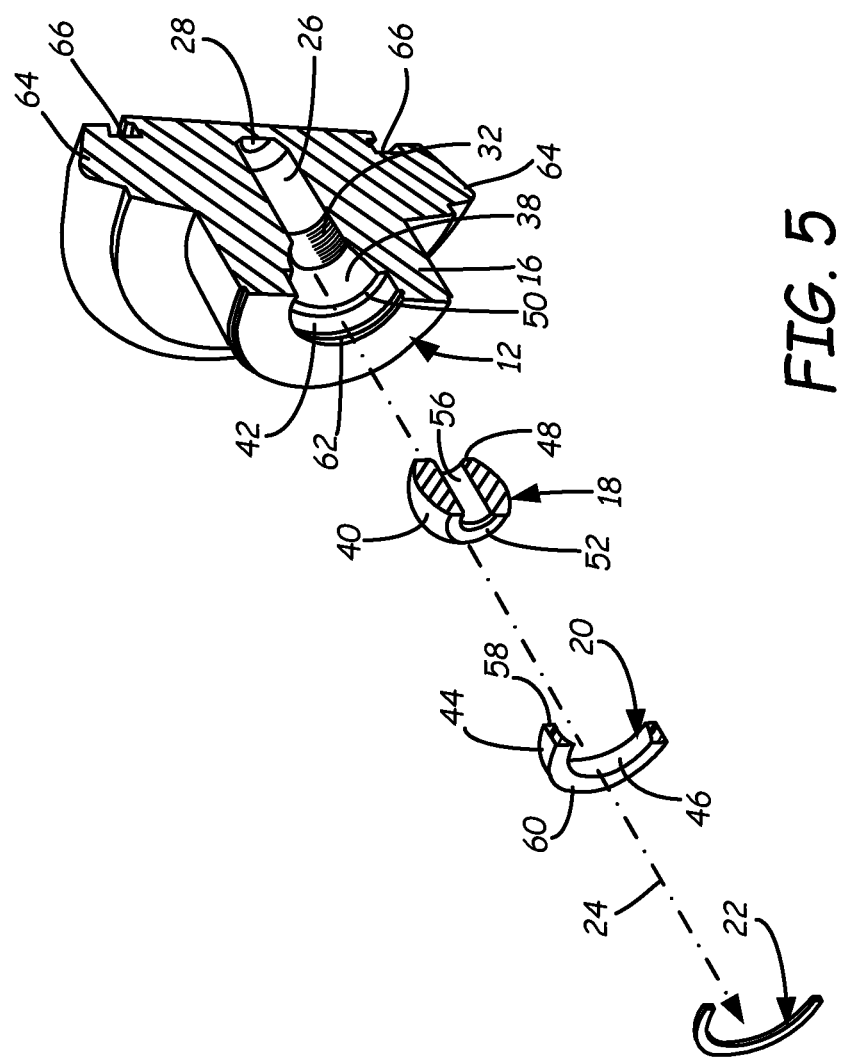
FIG. 5 is a cross-sectional perspective view of the exemplary boss, in exploded form, taken along line 5-5 of FIG. 4.
Figure 6:
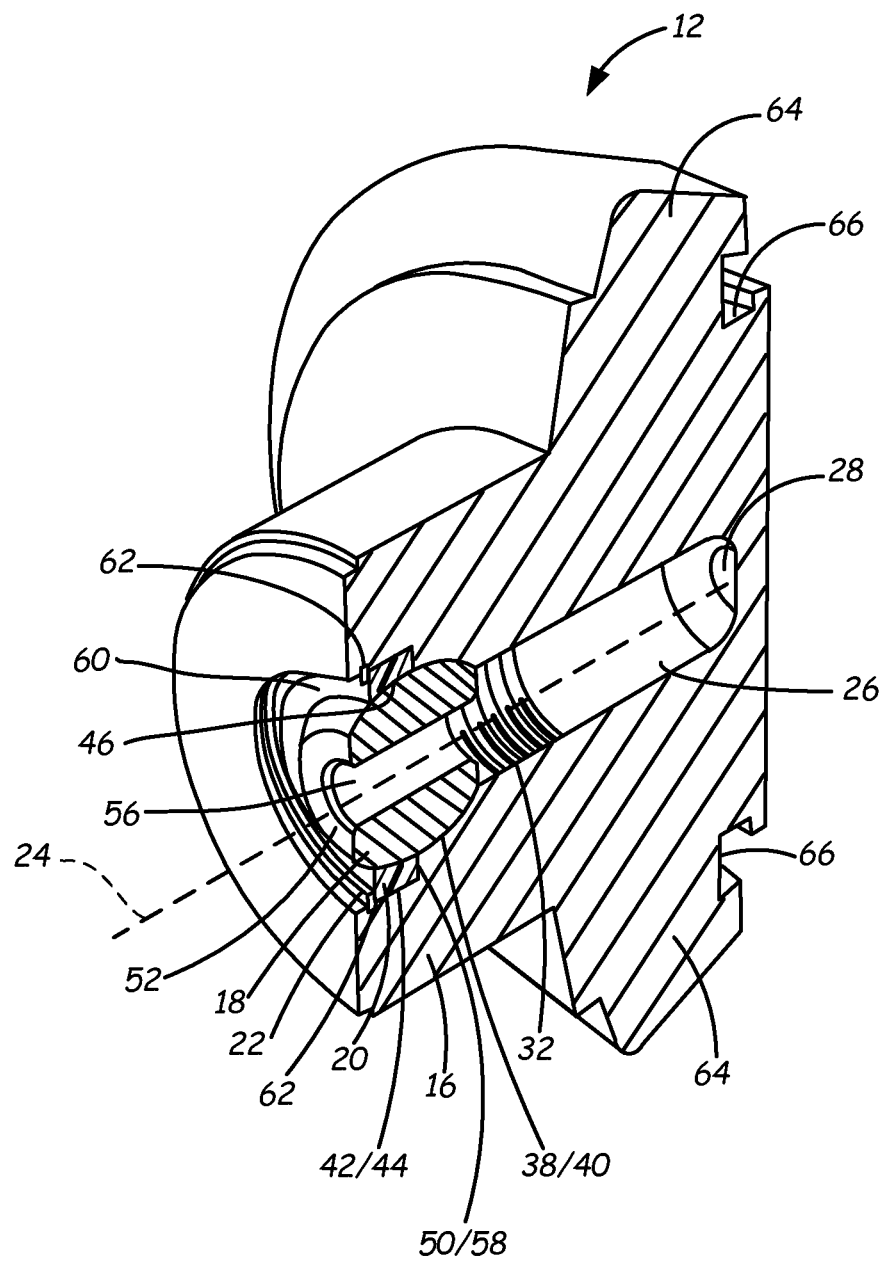
FIG. 6 is a cross-sectional perspective view of the boss of FIG. 5 with the components assembled together.
Figure 7:
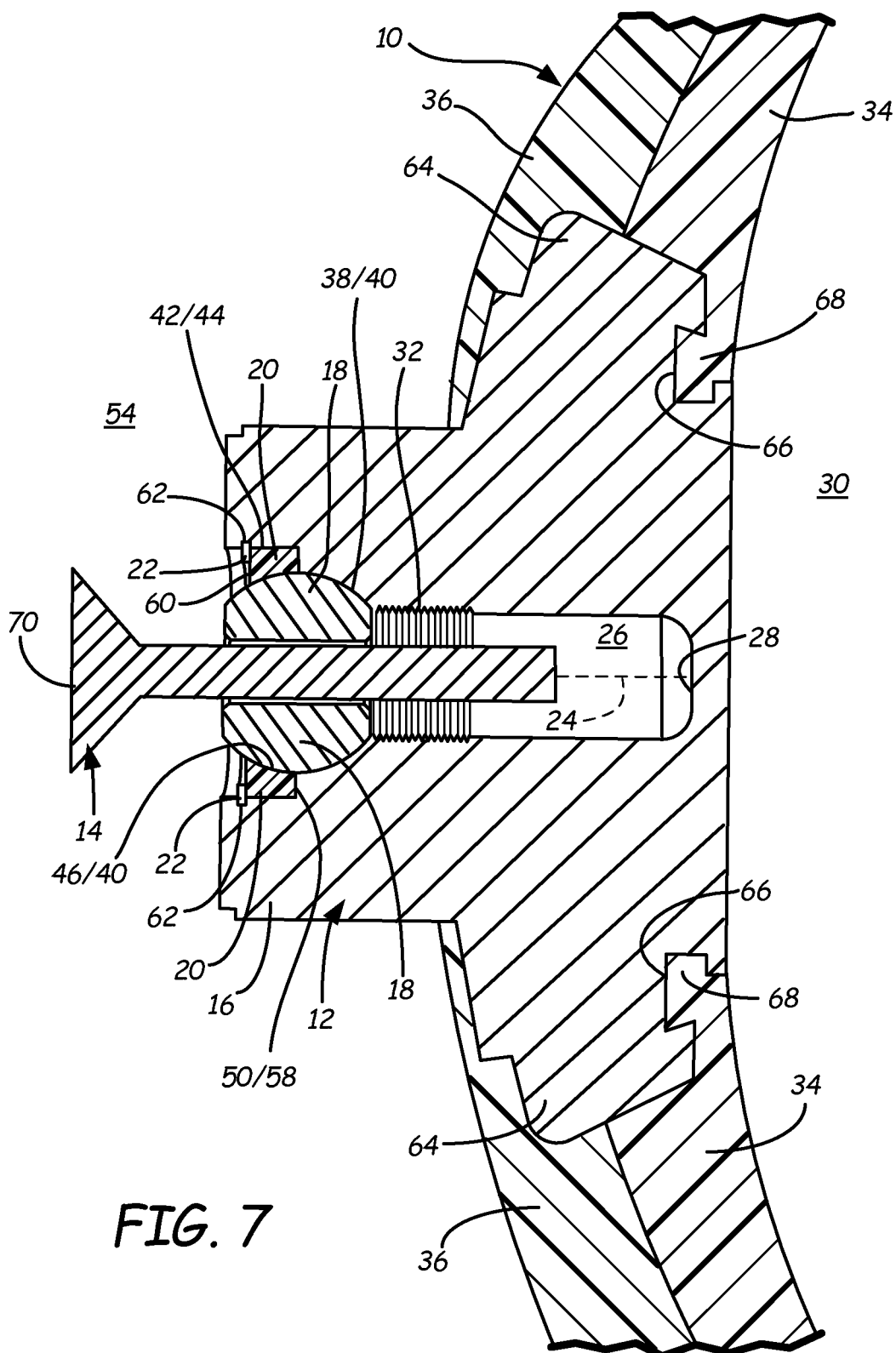
FIG. 7 is a cross-sectional view of a portion of the pressure vessel shown in FIG. 4, the section taken long line 5-5 of FIG. 4, with the components of the exemplary boss being assembled together, and further including a mounting pin by which the vessel can be mounted to exterior structures via the exemplary boss.

FIG. 4 is a perspective view of a pressure vessel 10 including an exemplary boss 12 of the present disclosure having an internal bearing 18 held within neck 16 of boss 12 by retainer 20 and retaining ring 22. FIG. 5 is an exploded perspective cross-sectional view of the exemplary boss 12, removed from vessel 10, wherein the cross section is taken along line 5-5 of FIG. 4. FIG. 6 is similar to FIG. 5, but shows components of boss 12 assembled together. FIG. 7 additionally shows the liner 34 and shell 36 of pressure vessel 10 formed around portions of boss 12; furthermore, mounting pin 14 is shown extending at least partially into bore 26 and through bore 56 of bearing 18.

In the exemplary embodiment shown in FIGS. 4-7, neck 16 of boss 12 is machined or otherwise formed with bore 26 therein. Bore 26 is configured to accept a bearing 18, which is disposed and retained within bore 26 by two annular retainers, namely a bearing cup retainer 20 and retaining ring 22. As shown in FIG. 7, a portion of a vessel mounting or attachment element, in this case configured as pin 14, is substantially contained within bore 26 of boss 12.

As shown in FIGS. 5-7, bearing 18 includes bore 56 therethrough. As shown in FIGS. 6 and 7, the longitudinal axes of bore 26 and bore 56 are co-axial along axis 24, which is coincident with a longitudinal axis of pressure vessel 10. As shown in FIG. 7, bore 56 is configured to allow insertion of a portion of pin 14 through bore 56 and into a portion of bore 26. Pin 14 is moveable longitudinally along axis 24 through bearing 18 and within bore 26 of boss 12. An exterior portion 70 of pin 14 is used in an exemplary method to mount vessel 10 on exterior vessel mount structures (not shown). In a conventional manner, exterior portion 70 may have fasteners, apertures, brackets, and other attachment features to allow such mounting of pin 14, and therefore pressure vessel 10, on conventional vessel mount structures. The disclosed mounting system allows vessel 10 to expand in length during pressurization due to the longitudinal sliding movement of pin 14 along axis 24 through bore 56 and at least partially within bore 26. Moreover, the disclosed system provides pressure vessel 10 with a degree of rotational freedom of motion about bearing 18, which is a spherical bearing in an exemplary embodiment, and axis 24 without affecting the placement of pin 14 relative to external structures attached to exterior portion 70. By locating bearing 18, retainers 20 and 22, and a significant portion of pin 14 substantially within boss 12, the disclosed boss 12 and mounting system thereby eliminate the need for a mounting block. Accordingly, the length of the vessel 10 usable for fluid containment and storage can be increased, compared to the length of cylinder 304 of assembly 300 of FIGS. 1-3, for a given length of a containment space.

As shown in FIGS. 5 and 6, boss 12 includes longitudinal bore 26. In some embodiments, boss 12 has an opening such as aperture at end wall 28 to provide fluid communication between bore 26 and an interior environment 30 (labeled in FIG. 7) of vessel 10. In other embodiments, boss 12 does not permit fluid communication between an interior environment 30 and exterior environment 54 of vessel 10 but is rather used primarily for mounting vessel 10. In those cases, another boss having a port therethrough can be provided elsewhere on vessel 10.

In an exemplary embodiment of boss 12, internal threads 32 are provided on at least a portion of a surface of bore 26 to allow boss 12 to be mounted on a mandrel (not shown), such as for forming liner 34 and shell 36 of pressure vessel 10 about boss 12. In an exemplary embodiment, bore 26 includes partially spherical inner surface 38 that is shaped to conform to an outer spherical surface 40 of bearing 18. In an exemplary embodiment, bore 26 includes a substantially cylindrical inner surface 42 configured to correspond in shape to cylindrical outer surface 44 of retainer 20. Moreover, retainer 20 has an inner surface 46 that is partially spherical to conform to the shape of a portion of outer spherical surface 40 of bearing 18. Bearing 18 in an exemplary embodiment includes an interior end surface 48 and an exterior end surface 52. As shown in FIGS. 6 and 7, exterior end surface 52 of bearing 18 is exposed to an exterior environment 54 of pressure vessel 10.

In an exemplary embodiment, retainer 20 includes interior end surface 58, configured to abut shoulder 50 of bore 26. Retainer 20 also includes exterior end surface 60, configured to be adjacent retaining ring 22. Retaining ring 22 in an exemplary embodiment has an outer diameter and thickness to allow it to at least partially fit into and snap into groove 62 of bore 26. Retaining ring 22 also has an inner diameter surface with a partially spherical configuration to conform to an outer portion of spherical surface 40 of bearing 18.

As shown in FIG. 6, an exemplary boss 12 includes flange 64 that extends radially outwardly from neck 16. In an exemplary embodiment, flange 64 includes groove 66 having a dovetail configuration. Referring to FIG. 7, for the formation of pressure vessel 10, boss 12 can be mounted on a vessel formation mandrel (not shown, via threads 32). Thus positioned, molten polymer material is allowed to flow around an interior form (not shown), wherein the liner material is allowed to flow into groove 66 to form interlocking tabs 68 that mechanically interlock liner 34 with flange 64 of boss 12. After the material for liner 34 has cured or otherwise solidified, a filament winding process can be used to form shell 36 around liner 34 and outer portions of flange 64.

Although the subject of this disclosure has been described with reference to several embodiments, workers skilled in the art will recognize that changes may be made in form and detail without departing from the scope of the disclosure. For example, in exemplary embodiments, bearing 18 is a spherical bearing that allows for multiple degrees of freedom in the mounting of pressure vessel 10 to external structures (not shown) via pin 14, shown in FIG. 7. However, the space saving advantages of positioning bearing 18 at least partially within boss 12 can be realized with a non-spherical bearing, including a journal sleeve, bushing, cylindrical, linear and other bearing configurations. The bearing itself may be formed of or include a compressible material such as rubber, for example, to additionally offer vibration control or motion deflection performance. Moreover, freedom of motion in mounting pressure vessel 10 to external structures can also be achieved by using a flexible and resilient pin 14, for example. Additionally or alternatively, pin 14 can be mounted to flexible or resilient external structures (not shown). Pin 14 can have a circular cross section or another shape, such as hexagonal, for example, to allow keying with a correspondingly shaped bore 56. Additionally, while optimized space savings are realized when bearing 18 is mounted at least partially within boss 12, bearing 18 can alternatively or additionally be surface mounted on an end surface or outer surface of boss 12. In addition, any feature disclosed with respect to one embodiment may be incorporated in another embodiment, and vice-versa.

What is claimed is:

1. A mounting assembly configured for attachment to a pressure vessel in alignment with a central, longitudinal axis of the pressure vessel, the mounting assembly including a boss and a pin:
   the boss including:
      a tubular neck that is configured to project outwardly from an interior of the pressure vessel;
      a first bore in the neck having a closed end such that the first bore does not communicate with the interior of the pressure vessel;
      a spherical bearing disposed at least partially within the first bore and including a second bore therethrough;
      wherein the first bore includes a surface that is at least partially spherical and corresponds to a first portion of an outer spherical surface of the bearing; and
      a retainer disposed between a second portion of an outer spherical surface of the bearing and a portion of the first bore; and
   the pin extending through the second bore and into the first bore, the pin configured for axial motion within the first bore and along the longitudinal axis.

2. The boss of claim 1 wherein the first bore and the second bore have co-axial longitudinal axes.

3. The boss of claim 1 wherein the retainer includes an inner surface that is at least partially spherical and corresponds to the second portion of the outer spherical surface of the bearing.

4. The boss of claim 1 wherein:
   the first bore includes a shoulder; and
   the retainer includes an interior end surface configured to abut the shoulder.

5. The boss of claim 1 wherein the retainer is annular.

6. The boss of claim 1 wherein:
   the first bore includes a groove; and
   the retainer is configured to at least partially fit into the groove.

7. A system for supporting a pressure vessel on a vessel mount, the system including:
   a boss configured for attachment to the pressure vessel in alignment with a central, longitudinal axis of the pressure vessel, the boss having a tubular neck that is configured to project outwardly from an interior of the pressure vessel, the neck having a first bore therein having a closed end such that the first bore does not communicate with the interior of the pressure vessel;
   a spherical bearing disposed at least partially within the first bore and having a second bore therethrough, wherein the first bore includes a surface that is at least partially spherical and corresponds to a first portion of an outer spherical surface of the bearing;
   an attachment element configured to be affixed to the vessel mount, wherein a portion of the attachment element extends through the second bore and is slidable within the first and second bores substantially along a longitudinal axis of the pressure vessel; and
   a retainer disposed between a second portion of an outer spherical surface of the bearing and a portion of the first bore.

8. The system of claim 7 wherein the retainer includes an inner surface that is at least partially spherical and corresponds to the second portion of the outer spherical surface of the bearing.

9. The system of claim 7 wherein:
the first bore includes a shoulder; and
the retainer includes an inner end surface configured to abut the shoulder.

10. The system of claim 7 wherein the retainer is annular.

11. The system of claim 7 wherein:
the first bore includes a groove; and
the retainer is configured to at least partially fit into the groove.

12. The system of claim 7 wherein the attachment element is configured as a pin.

13. A method for supporting a pressure vessel having a boss on a vessel mount, wherein the boss is attached to the pressure vessel in alignment with a central, longitudinal axis of the pressure vessel, the boss having a tubular neck that is configured to project outwardly from an interior of the pressure vessel, the neck having a first bore therein, a spherical bearing disposed at least partially within the first bore and having a second bore therethrough, wherein the first bore includes a surface that is at least partially spherical and corresponds to a first portion of an outer spherical surface of the bearing, the method including:
   inserting a first portion of an attachment element through the second bore and a portion of the first bore, wherein the first bore has a closed end such that the first bore does not communicate with the interior of the pressure vessel;
   mounting a second portion of the attachment element to the vessel mount; and
   passing the first portion of the attachment element through a retainer that keeps the bearing at least partially within the first bore;
   wherein the attachment element is configured for axial motion within the first bore and along the longitudinal axis.

* * * * *